US011294851B2

(12) United States Patent
Master et al.

(10) Patent No.: US 11,294,851 B2
(45) Date of Patent: Apr. 5, 2022

(54) RECONFIGURABLE REDUCED INSTRUCTION SET COMPUTER PROCESSOR ARCHITECTURE WITH FRACTURED CORES

(71) Applicant: Cornami Inc., Santa Clara, CA (US)

(72) Inventors: Paul L. Master, Sunnyvale, CA (US); Frederick Furtek, Menlo Park, CA (US); Martin Alan Franz, II, Sunnyvale, CA (US); Raymond J. Andraka PE, North Kingstown, RI (US)

(73) Assignee: Cornami, Inc., Campbell, CA (US)

( * ) Notice: Subject to any disclaimer, the term of this patent is extended or adjusted under 35 U.S.C. 154(b) by 8 days.

(21) Appl. No.: 15/970,915

(22) Filed: May 4, 2018

(65) Prior Publication Data

US 2019/0340152 A1 Nov. 7, 2019

(51) Int. Cl.
*G06F 9/30* (2018.01)
*G06F 15/78* (2006.01)
*G06F 15/80* (2006.01)
*G06F 7/57* (2006.01)

(52) U.S. Cl.
CPC ........ *G06F 15/7867* (2013.01); *G06F 9/3001* (2013.01); *G06F 9/30145* (2013.01); *G06F 9/30181* (2013.01); *G06F 15/8007* (2013.01); *G06F 7/57* (2013.01)

(58) Field of Classification Search
None
See application file for complete search history.

(56) References Cited

U.S. PATENT DOCUMENTS

2005/0166033 A1* 7/2005 Jacob .................. G06F 15/8007
712/11
2018/0308202 A1* 10/2018 Appu ........................ G06T 1/20

OTHER PUBLICATIONS

Smith, Ryan, "NVIDIA Announces DRIVE PX 2—Pascal Power For Self-Driving Cars", Jan. 5, 2016, retrieved from <<https://www.anandtech.com/show/9903/nvidiaannounces-drive-px-2-pascal-power-for-selfdriving-cars>>, 8 Pages.

* cited by examiner

*Primary Examiner* — John M Lindlof
(74) *Attorney, Agent, or Firm* — Rimon PC; Marc Kaufman (57) ABSTRACT

Systems and methods for reconfiguring a reduced instruction set computer processor architecture are disclosed. Exemplary implementations may: provide a primary processing core consisting of a RISC processor; provide a node wrapper associated with each of the plurality of secondary cores, the node wrapper comprising access memory associates with each secondary core, and a load/unload matrix associated with each secondary core; operate the architecture in a manner in which, for at least one core, data is read from and written to the at least cache memory in a control-centric mode; the secondary cores are selectively partitioned to operate in a streaming mode wherein data streams out of the corresponding secondary core into the main memory and other ones of the plurality of secondary cores.

24 Claims, 12 Drawing Sheets

RECONFIGURABLE REDUCED INSTRUCTION SET COMPUTER PROCESSOR ARCHITECTURE WITH FRACTURED CORES

FIELD OF THE DISCLOSURE

The present disclosure relates to systems and methods for a reconfigurable reduced instruction set computer processor architecture. also use this, describe all risc, all fractal and mix

BACKGROUND

Computing needs have changed drastically over the last several years. Since the 1980s, computer processor design has been focused on optimizing processors to execute computer code of enormous sizes. For example, Microsoft Office, a popular productivity suite, has been estimated to have tens of millions of lines of code. Yet, the data size that these massive code bases manipulate are comparatively small. Again using Office as an example, a Word document of several megabytes is all that is being manipulated by the code base in most cases. Other applications, such as graphics processing while generating a massive amount of data, have the same lopsided characteristic of a large code base manipulating a relatively small working set size of data. Thus, the design of conventional graphics processors has been based on techniques similar to processors for more code intensive applications.

Complex Instruction set Computing (CISC) processors are based on a processor design where single instructions can execute several low-level operations (such as a load from memory, an arithmetic operation, and a memory store) or are capable of multi-step operations or addressing modes within single instructions. CISC processors are characterized by having many clock cycles per each instruction, a slow overall clock due to the large amount of circuitry required to implement each complex instruction, and a single control thread, thus characterized as being control-centric. The term "control-centric", as used herein, refers to a processor that relies primarily on reading and executing instructions for its processing and moving of data. In most applications, moving data is the most resource intensive operation.

More recently, Reduced Instruction Set Computing (RISC) processors have become popular. A RISC processor is one whose instruction set architecture has a set of attributes that allows it to have much simpler circuitry required to implement its instructions and thus a lower cycles per instruction than a complex instruction set computer. A processor that has a small set of simple and general instructions running faster, rather than a large set of complex and specialized instructions running slower is generally more efficient. RISC processors are characterized by having relatively few clock cycles per instruction, a fast clock, a single control thread, and are characterized as being control centric.

Due to the requirement that processors must run very large instruction code bases RISC processors have been optimized with multiple levels of memory caches that are backed up by even larger Double Data Rate (DDR) DRAM memory. The smaller memory caches are faster from a clock cycle access point of view than the large DRAM. Since code exhibits "locality of reference", that is the probability that the next instruction required to be executed in the code base is relatively nearby (as defined by its address), the DRAM holds the majority of the executable code, and the specific code to be executed is loaded from the DRAM into the memory caches with a high probability that the next instruction to be accessed will be available in the cache. While this multiple level cache system is excellent in terms of speeding up the execution of large code bases, it fails when moving large amounts of data.

Modern RISC processor designs consist of a multiplicity of levels of caches. This allows flexibility of instructions flow for large executable code bases but is not efficient for large amounts of data. Moving data in and out of caches is relatively slow, there is overhead in extra circuitry required to maintain cache coherency across all the levels of caches and memory and requires a large amount of energy. This "penalty" is acceptable when a group of instructions is brought in from DRAM and executed multiple times from a cache but is highly inefficient for data movement. Data that needs to be processed once, must go thru the cache overhead (extra power dissipation, extra circuitry which equates to slower clock speeds, and multiple copies in multiple caches) of the caches.

This data movement penalty is the characteristic of modern processor architectures, including graphic processor units (GPU). Multi-core designs of processors and GPUs replicate the caches per individual processor core and only serve to exacerbate the performance and power dissipation penalty of using these legacy architectures to solve problems that require vast amounts of data movement. Therefore, recent developments in computing technology, such as Artificial Intelligence (AI), Deep Learning (DL), Machine Learning (ML), Machine Intelligence (MI), and Neural Networks (NN), which require enormous amounts of computing resources both in terms of number of processor cores whose total sum aggregate performance is measured in TeraOperations (Trillions of operations) or TeraFLOPS (Trillion of Floating Point Operations) per second and power dissipation measured in the 100's of watts. These modern DL, ML, MI and NN algorithms have the characteristic of requiring massive amounts of data movements with very small code bases which are characterized as data-centric. For example, SEGNET, a neural network architecture for semantic pixel-wise segmentation, requires that all data that is processed in each layer of the neural network must be moved by memory caches in a conventional processor.

Current software programmable processor designs have not provided processors that are efficient in supporting AI applications, such as image recognition required for autonomous vehicles. For example, NVIDIA's Drive PX 2™ is used in Tesla vehicles to power the Autopilot feature using Tesla Vision™ image processing technology. The computer is comparable in computing power to about 150 MacBook Pros™ and has been reported to consume 250 W of power and require liquid cooling. See AnandTech, *NVIDIA Announces DRIVE PX 2—Pascal Power For Self-Driving Cars*, Ryan Smith, Jan. 5, 2016; https://www.anandtech.com/show/9903/nvidia-announces-drive-px-2-pascal-power-for-selfdriving-cars.

Other algorithm specific processor designs have been focused on AI applications, and other data-intensive applications, however, such designs have resulted in processors that are application specific and inflexible. Further, software configurable processors based on FPGA (Field Programmable Gate Arrays) are well-known. While such processors are more flexible than conventional processors, they still do not provide the efficiency and flexibility required for modern data-centric applications.

SUMMARY

One aspect of the present disclosure relates to a system configured for using a multi-core reduced instruction set computer processor architecture. The system may include one or more hardware processors configured by machine-readable instructions. A RISC processor, may define a primary processing core, and include one or more processing elements (e.g. ALU unit(s), Integer Multiplier unit(s), Integer Multipler-Accumulator unit(s), Divider unit(s), Floating Point ALU unit(s), Floating Point Multiplier unit(s), FP Multiplier-Accumulator unit(s), Integer Vector unit(s), Floating Point Vector unit(s), integer SIMD (single instruction, multiple Data) unit(s), Bit Encryption/Decryption unit (s)). Each primary processing core includes a main memory and at least one cache memory or local memory interfacing to a Network-On-Chip. Each RISC core being configurable as either RISC mode or streaming mode via a machine-readable-writeable configuration bit. In the streaming mode, each processor block becomes an individually accessible secondary, i.e. "fractured" core. Each fractured core having at least one arithmetic "processor block" and being capable of reading from and writing to the at least one cache or local memory in a data-centric mode via interfaces to a Network-on-Chip. A node wrapper associated with each of the plurality of fractured cores, being configured to allow data to stream out of the corresponding fractal core into the main memory and other ones of the plurality of fractal cores and to allow data from the main memory and other fractal cores to stream into the corresponding core in a streaming mode. The node wrapper may include, access memory associate with each fractured core, a load/unload matrix associated with each fractured core. The processor(s) may be configured to partition logic module configured to individually configure each of the fractured cores to operate in the streaming mode (data-centric) or the control-centric mode.

Another aspect relates to a method for reconfiguring a reduced instruction set computer processor architecture, the method includes providing a primary processing core consisting of a RISC processor, each primary processing core comprising a main memory, at least one cache memory, and a plurality of secondary processing cores, each secondary processing core having at least one arithmetic logic unit, providing a node wrapper associated with each of the plurality of secondary cores, the node wrapper comprising access memory associates with each secondary core, and a load/unload matrix associated with each secondary core. The architecture is operated in a manner in which, for at least one core, data is read from and written to the at least cache memory in a control-centric mode and the cores are selectively partitioned to operate in a streaming mode wherein data streams out of the corresponding secondary core into the main memory and other ones of the plurality of secondary cores and data streams from the main memory and other secondary cores to stream into the corresponding core in a streaming mode or the control-centric mode.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

The inventors have developed an architecture and methodology that allows processor cores, such as known RISC processors to be leveraged for increased computing power. The processor cores, referred to as "primary cores" herein, are segregated into control logic and simple processing elements, such as arithmetic logic units. A node wrapper allows the architecture to be configurable into a streaming mode ("fractured moded") in which pipelines are defined and data is streamed directly to the execution units/processing elements as "secondary cores". Applicant refers to secondary cores using the tradename "Fractal Cores™." In a streaming mode, the processor control logic need not be used. The secondary cores are addressed individually and there is reduced need for data to be stored in temporary storage as the data is streamed from point to point in the pipelines. The architecture is extensible across chips, boards and racks.

Figure 1:
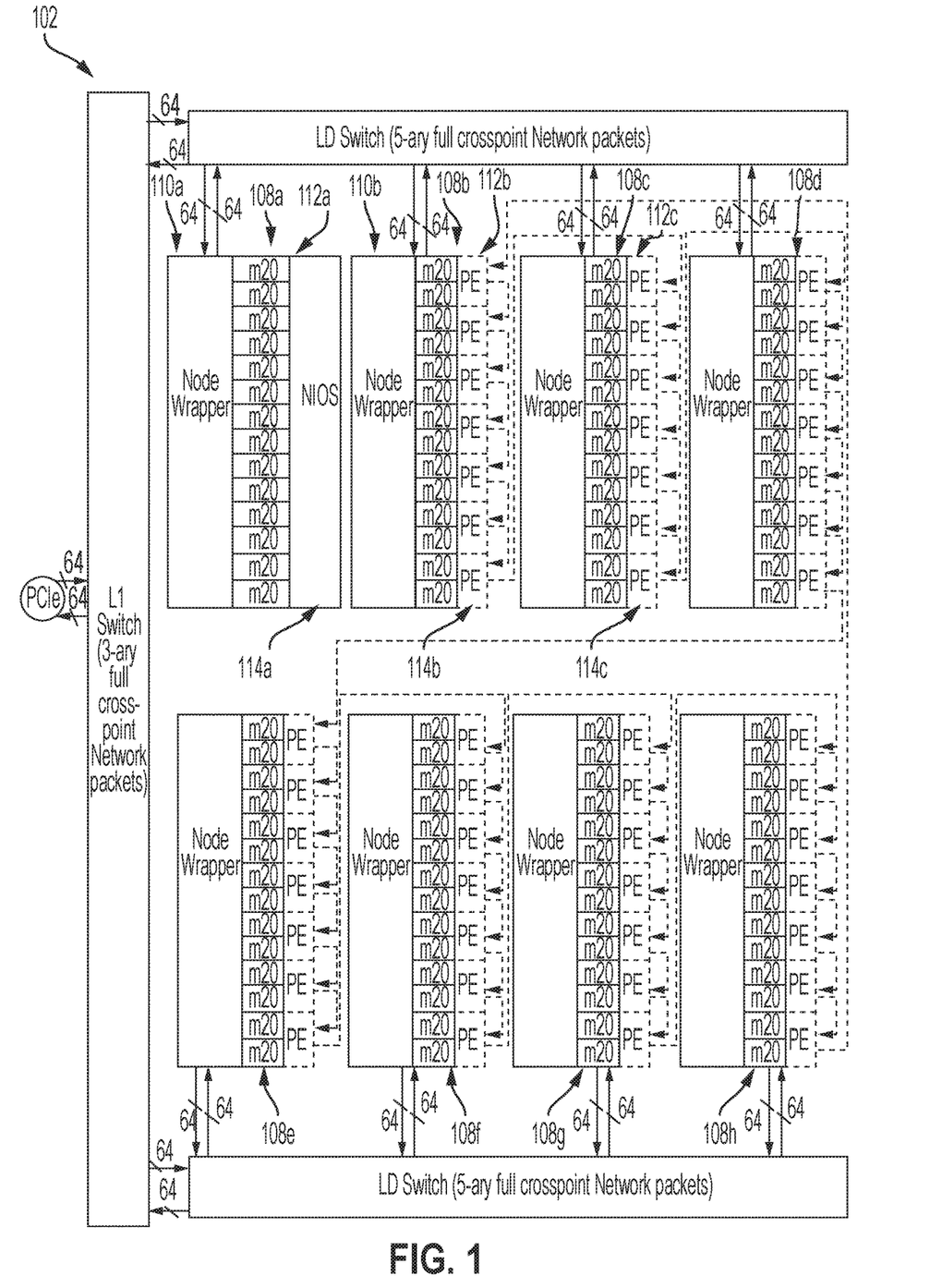
FIG. 1 is a schematic illustration of a processor architecture in accordance with one or more implementations.

FIG. 1 illustrates an example of a computing architecture. As illustrated in FIG. 1, architecture 102 includes multiple primary processing cores 108a, 108b . . . 108n. Each main processing core 108 can include a corresponding node wrapper 110a, 110b . . . 110n (only some of which are labeled 110 in FIG. 1. for clarity) as described in greater detail below. Each primary processing core 108 may be defined by a RISC processor, such as the Altera NIOS™ processor. By way of non-limiting example, each primary processing core 108 may include a corresponding main memory 112a, 112b . . . 112n (only some of which are labeled FIG. 1. for clarity) that includes multiple cache memories. The node wrappers 110 can include access memory associated with each secondary core, and a load/unload matrix associated with each secondary core. Each primary processing core 108 can also include a set of processing units 114a, 114b . . . 114n, such as arithmetic logic units (ALUs), which separately or collectively can define a secondary processing core as described in detail below.

A "wrapper" is generally known as hardware or software that contains ("wraps around") other hardware, data or software, so that the contained elements can exist in a newer system. The wrapper provides a new interface to an existing element. In embodiments, the node wrappers provide a configurable interface that can be configured to allow execution in a conventional control-centric mode or in a streaming mode, or fractured mode, that is described below.

In a conventional control-centric mode ("RISC mode"), the architecture uses the core control logic to control data flow and operates in a manner wherein data is read from and written to the cache memory and processed by a primary core in accordance with control logic. However, secondary cores 114 may be selectively "fractured" to operate in a fractured mode, as part of a pipeline, wherein data streams out of the corresponding secondary core into the main memory and other ones of the plurality of secondary cores and data streams from the main memory and other secondary cores to stream into the corresponding core, as described in greater detail below. As an example, a rectangular partition can be created from a result matrix y using single precision floating point arithmetic.

The node wrappers 110 may be configured to partition logic and an input state machine for transferring data from memory to the processing element and wherein each arithmetic logic unit has an output that is associated with an output memory. The output memory may be updated throughout processing with the latest sum as it is computed. Arithmetic logic units 114 of the RISC processor can be used as streaming secondary cores in the streaming mode. Each node wrapper 110 can be configured to define multiple hardware streams, i.e. pipelines, to be allocated to specific ones of the cores.

Figure 2A:
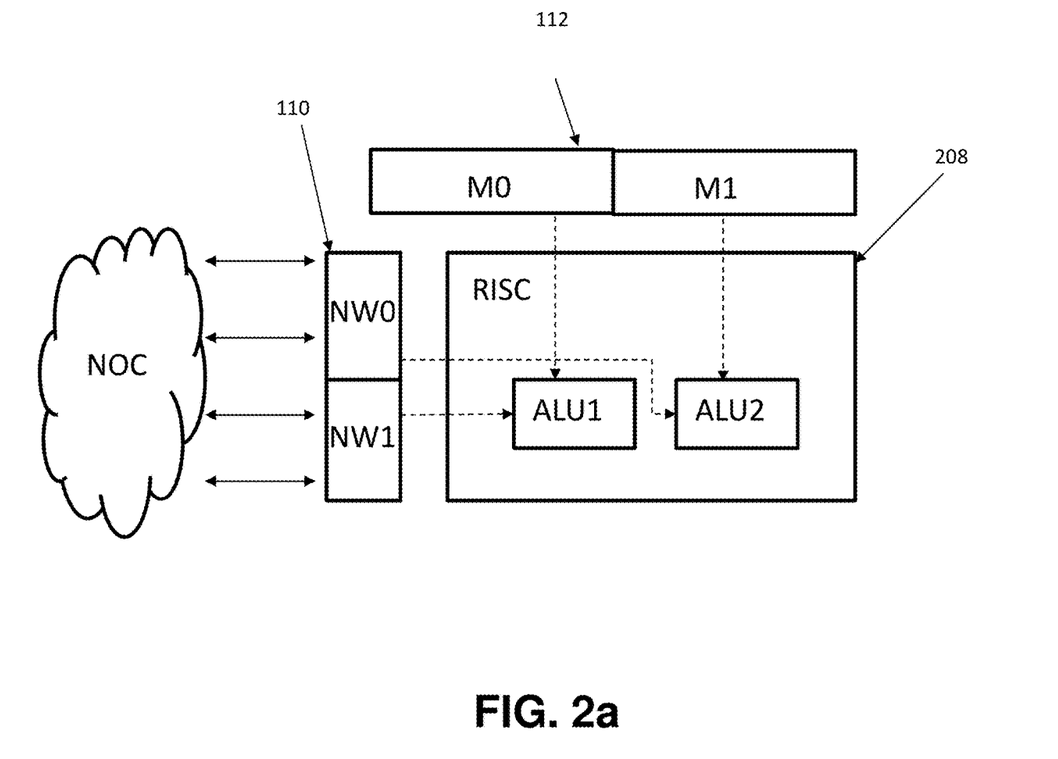
FIG. 2a is a schematic illustration of a single RISC processor and related hardware showing the data streams of both control mode and streaming mode.

FIG. 2a illustrates the two possible modes of operation, RISC mode and fractured mode, of the architecture. As illustrated in FIG. 2, RISC Processor 208 includes two processing elements, ALU1 and ALU2. Node Wrapper 210 includes two secondary node wrappers NW0 and NW1. Memory 212 includes secondary memories M0 and M1. In the RISC mode, the data streams indicated by the solid lines stream from a Network on a Chip (NOC), such as a PCIe bus, to memory 112 for processing by RISC processor 208. In the fractured mode, the streams are indicated by the dashed lines. In the fractured mode, node wrapper 210 is used as secondary node wrappers NW0 and NW1 and memory 212 is used as secondary memories M0 and M1 to define two data streams in this example. One data stream passed through ALU1 and one passed through ALU2 with ALU1 and ALU2 each defining a secondary core. Of course, the RISC processor can have any number of processing elements and data streams can be configured as needed. Note that, in this example, the RISC mode includes 4 data streams and a relatively large memory, while in the Fractured mode includes 2 data streams and a relatively small memory.

Figure 2B:
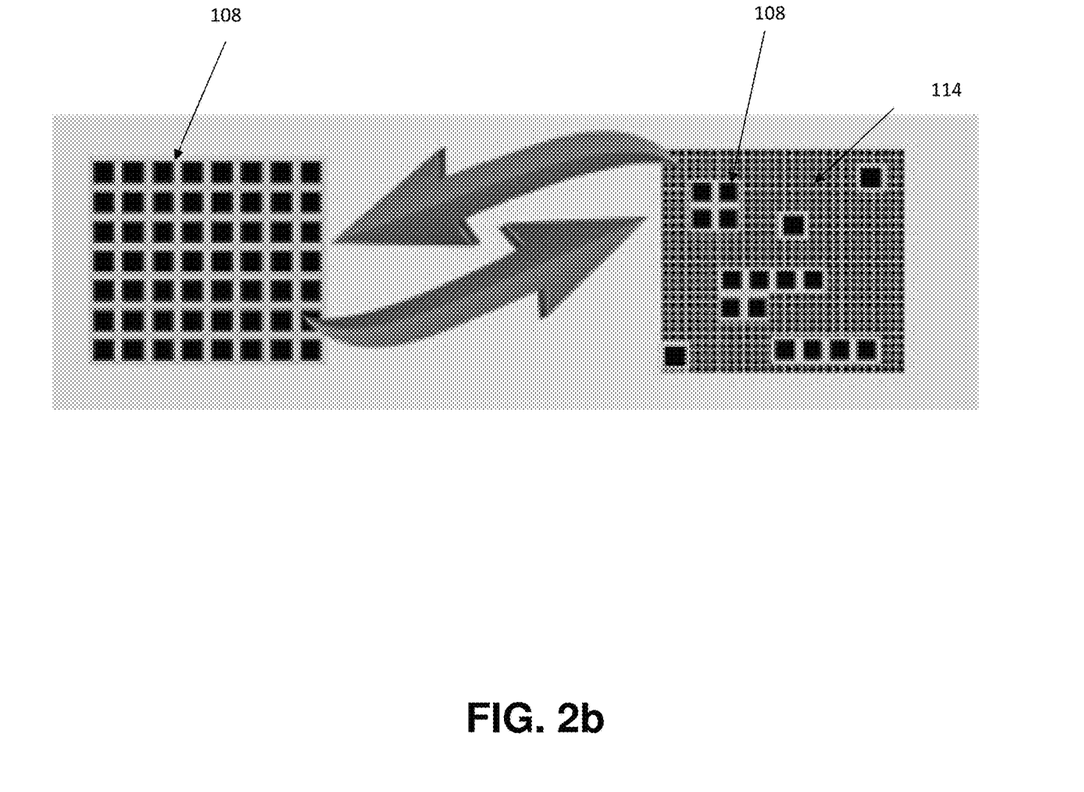
FIG. 2b is a schematic illustration of a processor architecture showing that the core modes can be dynamically and flexibly configured.

As illustrated schematically in FIG. 2b, some cores of the architecture can be configured to operate in the RISC mode while some are configured to operate in the fractured mode, as needed by any specific application at any specific time. Further, core modes can be configured dynamically, in real-time, during execution. On the left in FIG. 2b, all cores are configured as primary cores (RISC mode). On the right in FIG. 2b some cores are configured as primary cores and some cores are configured as secondary cores (fractured mode). The configuration can take any form as required by the specific application at the specific time. Some examples include:

112 RISC cores/1,480 Fractured Core (FC) cores: 896 RISC cores/12K FC cores per 1U server, 36K RISC cores/474K FC cores per Rack 480 RISC cores/7,420 FC cores: 4K RISC cores/60K FC cores per 1U server, 154K RISC cores/2.4 M FC cores per Rack 8196 RISC cores/131,136 FC cores: 66K RISC cores/1 M FC cores per 1U server 2.6 M RISC cores/42 M FC cores per Rack Referring to FIG. 1, the various interconnections are configured by the node wrappers using a Network on Chip (NOC). In this example, the NOC is a 2-layer NOC of L0 switches interconnected to a L1 switch via 64 bit lanes. The NOC also has an overlay network that interconnects all the secondary cores in a linear manner, as shown by the red arrows in FIG. 1. In this example, the switches are "crosspoint" switches, i.e. a collection of switches arranged in a matrix configuration. Each switch can have multiple input and output lines that form a crossed pattern of interconnecting lines between which a connection may be established by closing a switch located at each intersection, the elements of the matrix. In this example, a PCI Express (PCIe) buss interface is used. PCIe provides a switched architecture of channels that can be combined in ×2, ×4, ×8, ×16 and ×32 configurations, creating a parallel interface of independently controlled "lanes."

In some implementations, the architecture may be formed on a single chip. Each cache memory may be a nodal memory including multiple small memories. In some implementations, each core may have multiple arithmetic logic units. In some implementations, by way of non-limiting example, the arithmetic logic units may include at least one of integer multipliers, integer multiplier accumulators, integer dividers, floating point multipliers, floating point multiplier accumulators, floating point dividers. In some implementations, the arithmetic logic units may be single instruction multiple data units. As a simple example, an architecture can be made up of 500 primary processor cores 108 each having 16 processing elements. In the streaming mode, up to 8000 secondary cores 114 can be addressed individually. This allows for performance of massive mathematical operations, as is needed in Artificial Intelligence applications. The primary cores and secondary cores can be dynamically mixed to implement new algorithms.

Figure 3:
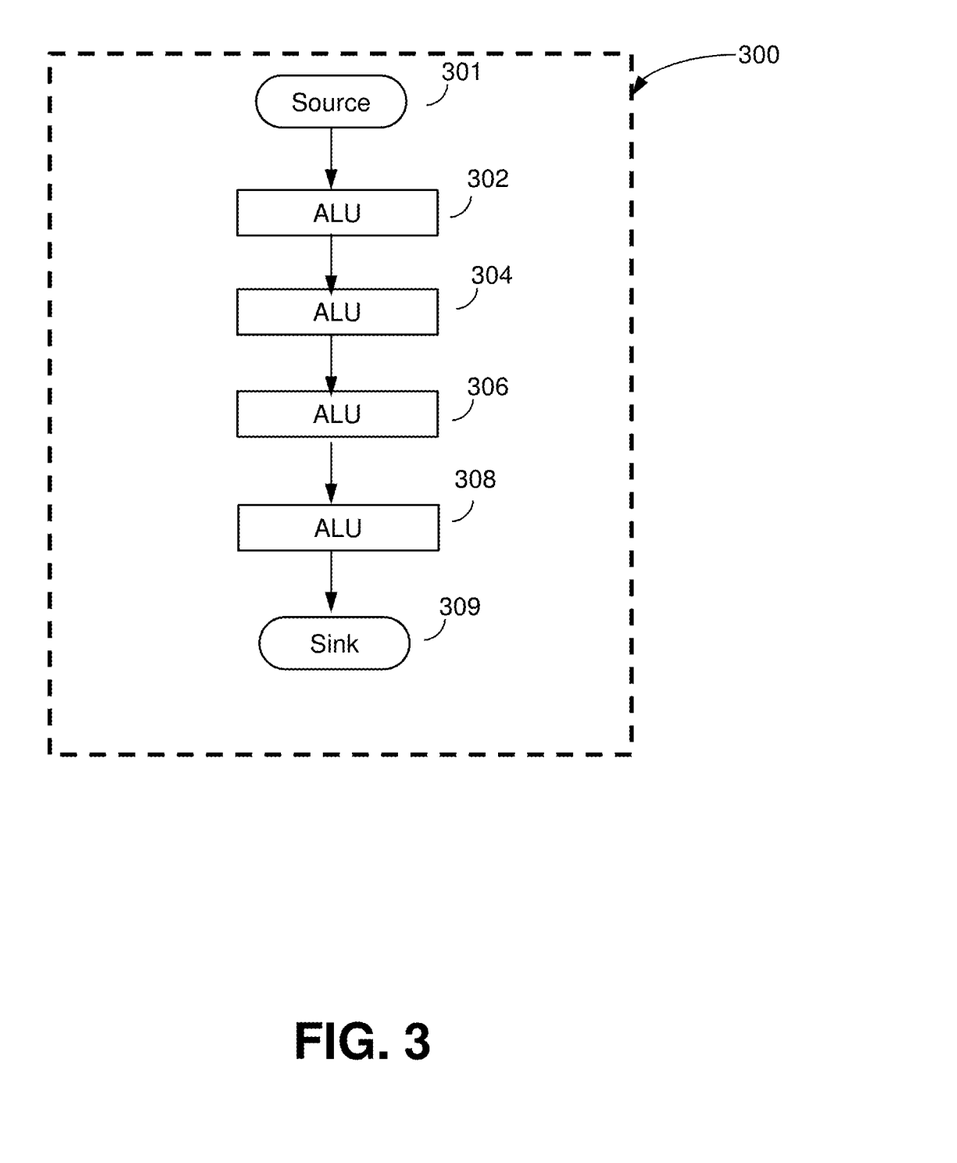
FIG. 3 is a flow chart of a pipeline of the computer processor architecture in a streaming mode, in accordance with one or more implementations.

The process and mechanism for configuring the architecture is described below. As noted above, the fractured mode is accomplished by defining one or more pipelines of streaming data between the secondary cores. FIG. 3 illustrates a simple data stream pipeline which connects 4 arithmetic logic units 302, 304, 306, and 308 in series so that an input from source 301 is processed into an output 309. The ALUs are examples of the processing elements described above that define the secondary cores. The pipeline is defined by setting the L0 and L1 switches in the NOC described above. Of course, the NOC can be configured in any manner to define any data stream pipeline(s). The appropriate node wrapper(s) 110 can execute code to configure the NOC. As an example, the pipeline of FIG. 2 can be configured by execution of the C++ code objects set forth below. Note that the keyword "threadModule" indicates to the tooling that the code to be executed will run on a RISC core, with the keyword "streamModule" indicating that the code to be executed will run on a Fractured Core.

```
class source: public threadModule { // code to run on a RISC core
    outputStream<int> outStrm;
    void code( );  // pointer to the RISC code
}; // sends data to output
class pipeline: public streamModule { // code to run on a Fractured core
    inputStream<int> inStrm;
    outputStream<int> outStrm;
    void code( );  // pointer to the operation the Fractured core will per-
form
}; // process data from input and send to output
class sink: public threadModule { // code to run on a RISC core
    inputStream<int> inStrm;
    void code( );  // pointer to the RISC code
}; // receives data from input
```

In the objects above "code( )" can point to the source code below:

```
// Example of code which can be run on a RISC core
void source::code( ) {
    int x;
    for (x = 0; x < 1000; ++x) // Put 1000 ints into outStrm {
        printf("Generating Data %d\n", x);
        outStrm << x; // TruStream put
    }
}
//Example of code which can be run on a Fractured Core
void pipeline::code( ) {
    int x;
    int sum = 0;
    inStrm >> x;     // get data from input stream
    sum += x * 3;    // perform some computation
    outStrm << sum; // TruStream put, send data to output stream
}
// Example of code which can be run on a RISC core
void sink::code( ) {
    int x;
    for (x = 0; x < 1000; ++x) {
        inStrm >> x;  // get data from input stream
        printf("Received Data %d\n", x);
    }
}
```

The code below serves to connect the topology of pipeline of FIG. 3, where source and sink are running on a RISC core, and 4 Fractured Cores are performing a MAC (multiplication with accumulation):

```
class pipelineTest: public streamModule {
    source src;
    pipeline pipe;
    sink snk;
    public:
    pipelineTest( ) // Constructor
    {
        src >> pipe >> pipe >> pile >> pipe >> snk; // Connect modules
        end( ); // Housekeeping
    }
};
```

Figure 4:
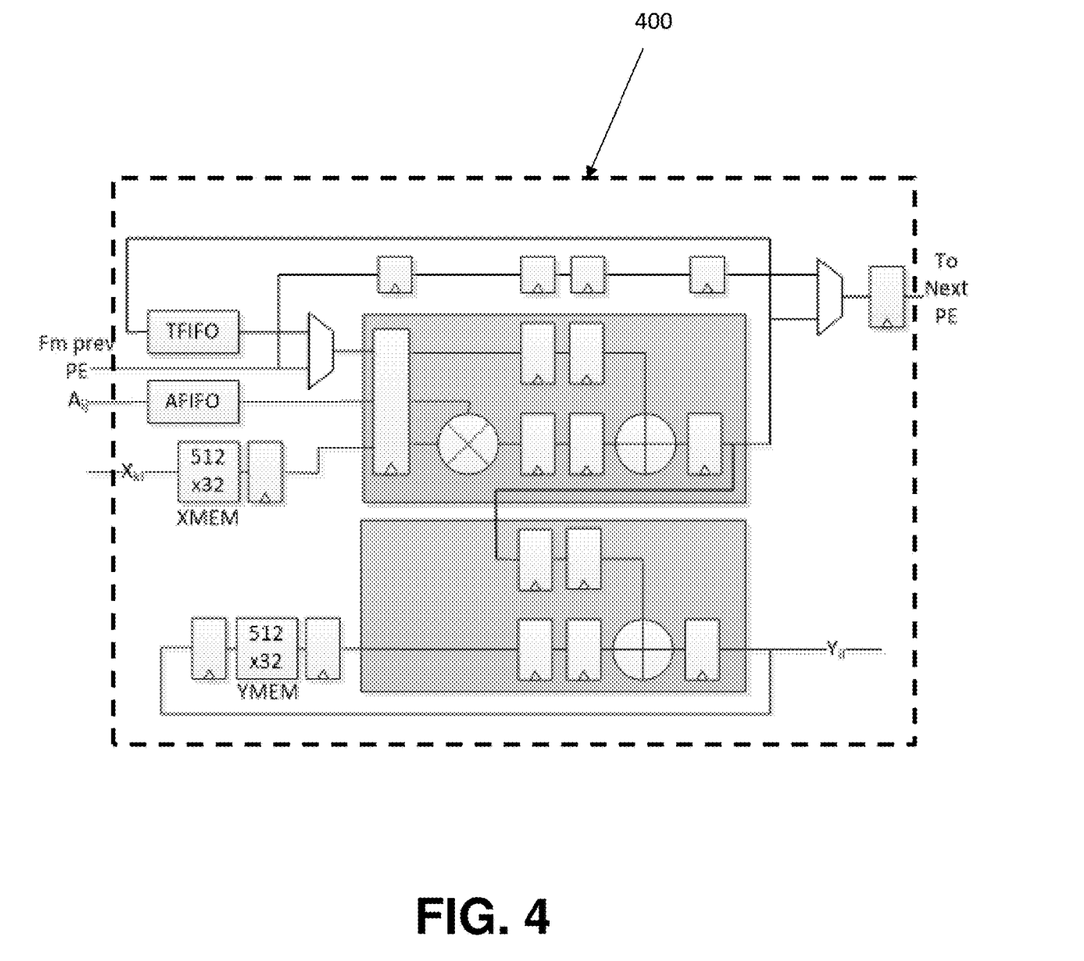
FIG. 4 is a schematic diagram of a secondary core in a streaming mode, in accordance with one or more implementations.

FIG. 4 illustrates a top-level diagram of an example of a secondary core 400 defined by processing elements. The pipeline configuration requires a number of clock cycles for a value to be read out of Y memory, added to the new product, and returned to Y memory before that element can be accessed again. A product that arrives before the Y memory element is ready to be read is shunted to the T-FIFO for later accumulation. Memory hazard logic (not shown) can be used to determine if the Y memory location for a new product has been used recently that controls steering of the data in the design. The pre-loaded X mem holds the partition of the X (right) matrix applicable to the partition of the Y (result) matrix performed by this Small Core. The applicable partition of the A (left) matrix is streamed into the PE in compressed form (non-zero elements only, accompanied by row/column info). The Y mem accumulates the products as the matrix is computed. The implementation can also include a peer-to-peer connection between adjacent processing elements 114 in a ring intended to permit dividing the processing load for particular Y-elements between two or more processing elements, which is useful to make the design scalable to larger matrices without a significant loss of performance.

Figure 5:
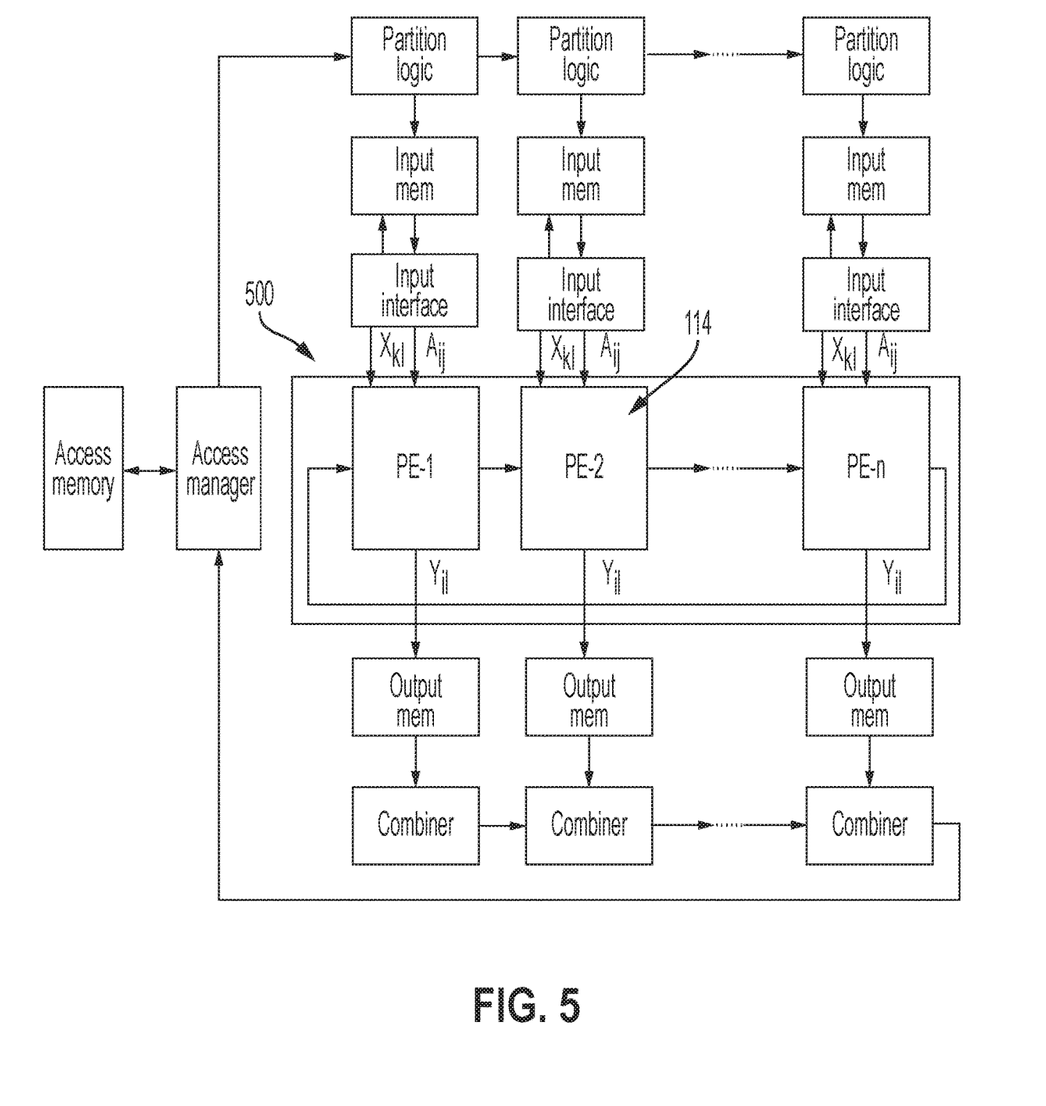
FIG. 5 is a schematic diagram of specific topology of a secondary core, in accordance with one or more implementations.

FIG. 5 illustrates a specific topology of secondary cores 500. The design includes a test scaffold built around the processing element ring that allows the test matrices to be initially stored in a central memory store, automatically partitioned and delivered to the processing elements, run through the processing elements with the option of continuously repeating the test matrices (for power measurement), and then have the result partitions collected and reassembled into the full output matrix and returned to the central memory where the result may be accessed easily using the memory initialization and dump tools.

Each processing element 114 in FIG. 5 is associated on the input side with a node input memory, partitioning logic and an input state machine for transferring data from the local memory to the processing element. On the output side, each processing element 114 is associated with an output memory that is updated throughout the process with the latest sum for each Y element as it is computed. At the completion of the matrix processing, the accumulated data in the output memory is transferred back to the central access memory via combiners that either pass data from the previous processing element 114, or replace input with data from the local processing element 114 to reconstruct the full matrix as the matrix is scanned by row and column.

The programming and data information in the central access memory includes a setup word for each processing element 114 that contains partition information for the processing element 114. That setup word configures the partition logic at each processing element 114 to only use data with rows and columns associated with the processing element's partition. Both the pre-load X matrix data and the streaming A matrix data arrive over the same path and use the same partition setup to select data out of the data stream from the central memory. Selected data at each processing element 114 gets written into the node input memory and held until the access manager completes transferring data and starts the processing. When processing starts, the processing uses only the data that has been transferred into the node memories, and stops when the end of the data has been reached. If the repeat bit is set in the start word, the pointer into the node input memory is reset to 0 when the end of the buffered data is reached and allowed to repeat the data indefinitely. This allows power measurements to be made.

Figure 6:
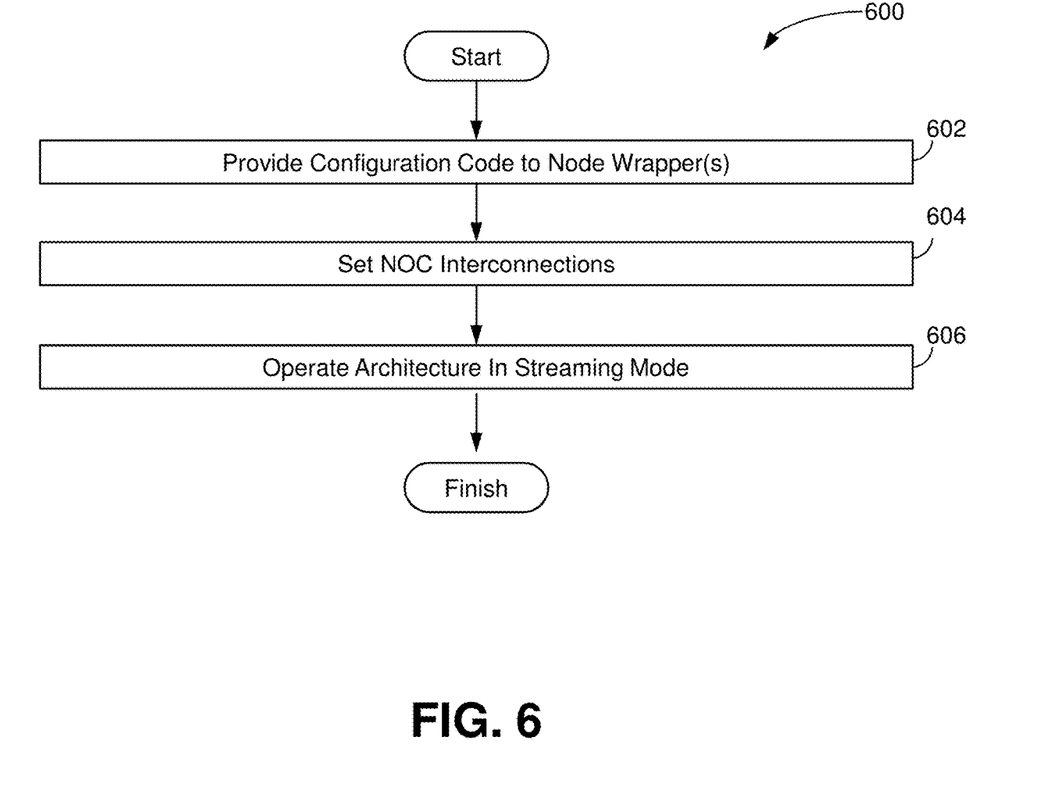
FIG. 6 is a flow chart of a method for configuring an architecture. In accordance with one or more implementations.

FIG. 6 illustrates a method 600 for reconfiguring a reduced instruction set computer processor architecture, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

An operation 602 may include providing configuration code to one or more node wrappers. An operation 604 may include executing the configuration code to set the interconnections of the NOC in a manner which creates at least on pipeline. An operation 606 may include operating the architecture in a streaming mode wherein data streams out of the corresponding secondary core into the main memory and other ones of the plurality of secondary cores and data streams from the main memory and other secondary cores to stream into the corresponding core in a streaming mode or the control-centric mode.

Figure 7:
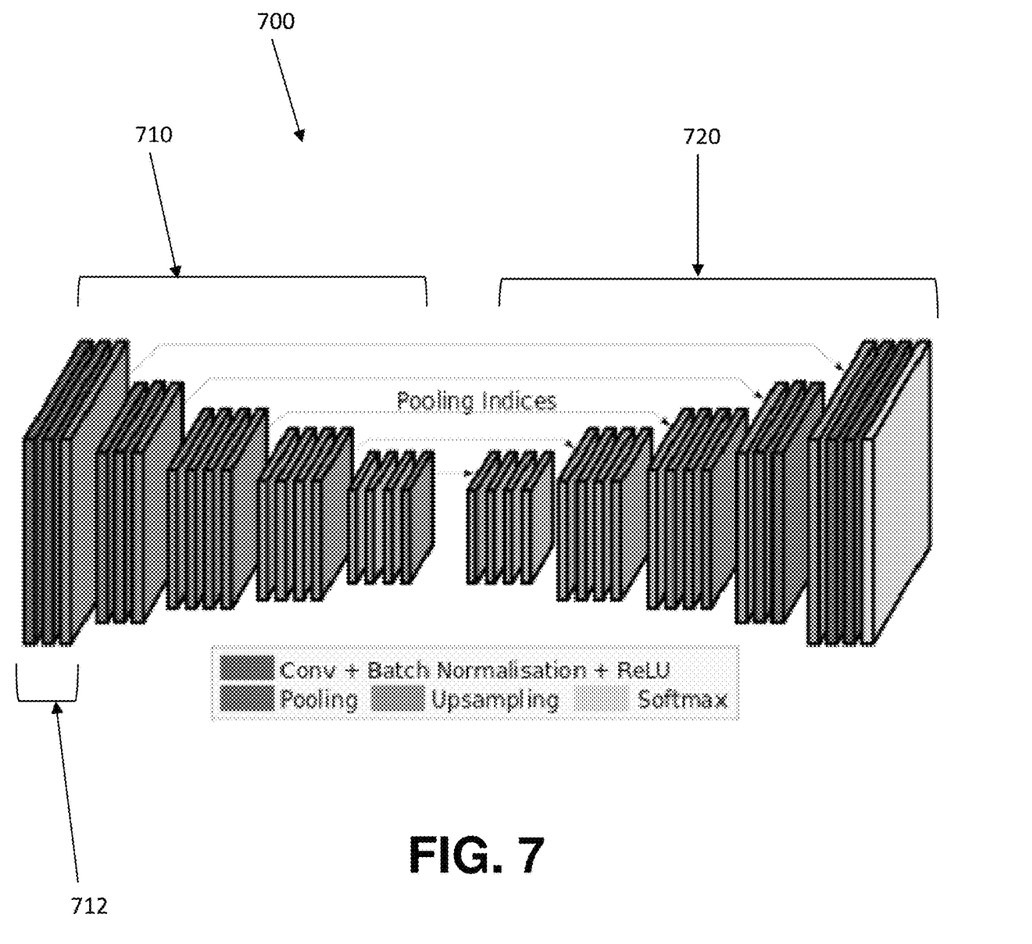
FIG. 7 is schematic diagram of a SegNet architecture.
Figure 8:
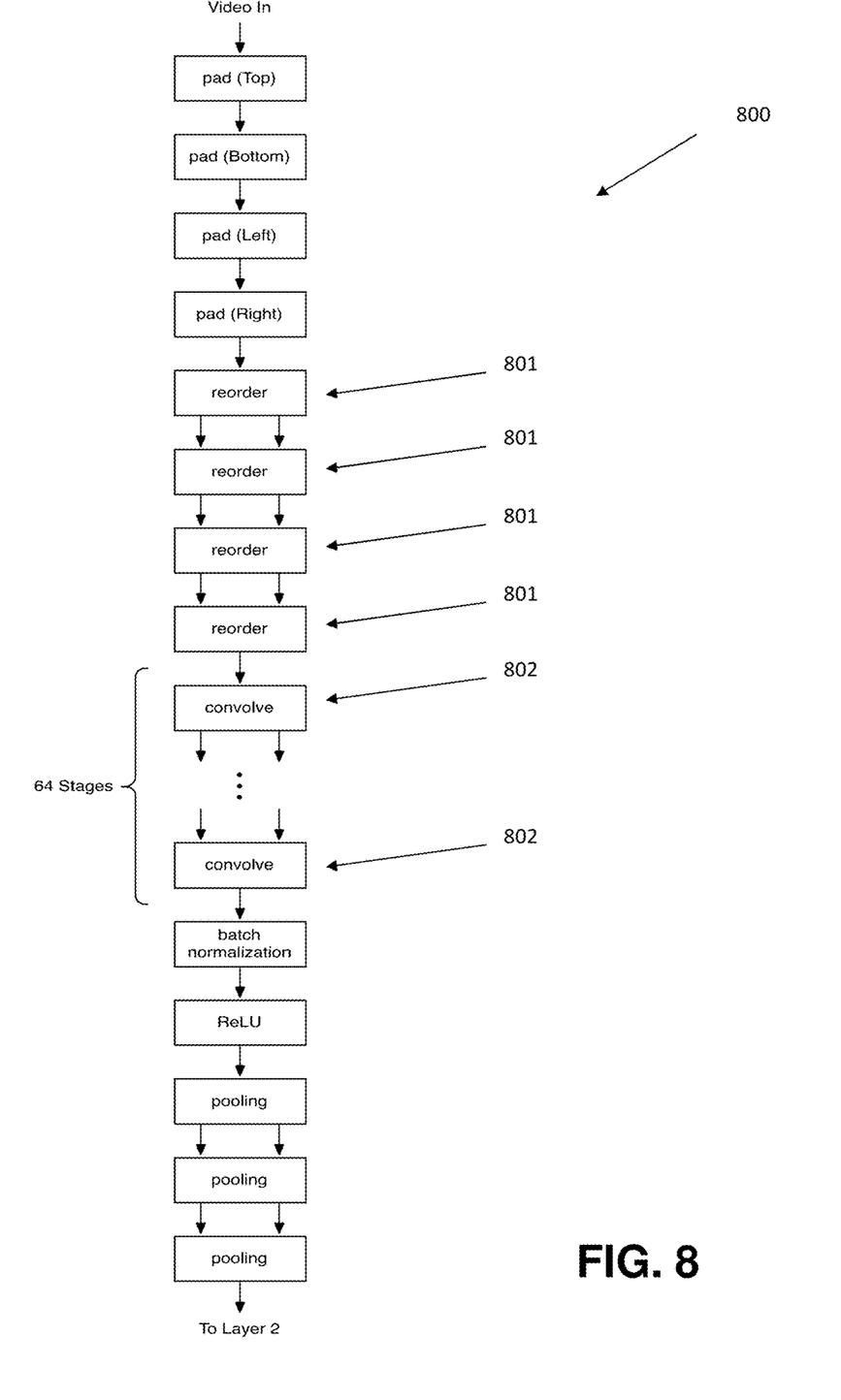
FIG. 8 is a flow chart of a data stream of a portion of the SegNet implementation.

FIGS. 7 and 8 illustrates a specific example of the architecture applied to a SegNet topology. As noted above, SegNet is a fully convolutional neural network (CNN) architecture for semantic pixel-wise segmentation. This core trainable segmentation engine consists of an encoder network, a corresponding decoder network followed by a pixel-wise classification layer. The architecture of the encoder network is topologically identical to the 13 convolutional layers in the VGG16 network. The role of the decoder network is to map the low resolution encoder feature maps to full input resolution feature maps for pixel-wise classification. The SegNet decoder upsamples its lower resolution input feature map(s). Specifically, the decoder uses pooling indices computed in the max-pooling step of the corresponding encoder to perform non-linear upsampling. This eliminates the need for learning to upsample. The upsampled maps are sparse and are then convolved with trainable filters to produce dense feature maps.

As illustrated in FIG. 7, a SegNet Topology 700 includes encoder 710 and decoder 720. The three-dimensional CNN topology can be transformed into an equivalent one-dimensional topology using the techniques disclosed herein. SegNet Layer 1 712 can be transformed into the 77-stage fractured core pipeline 800 shown in FIG. 8. The stages illustrated in FIG. 8 perform the following operations:

pad (Top), pad (Bottom), pad (Left) and pad (Right) add zero-padding around the image. Does not require memory.

The reorder stages convert the row-based video stream into a window-based stream. Accesses on-die SRAM.

The 64 convolve stages perform a convolution for each of the 64 filters (kernels). Accesses on-die SRAM.

The batch-normalization stage performs batch normalization. Accesses on-die SRAM.

The ReLU stage implements the Rectified Linear Unit (ReLU) activation function. Does not require memory.

The three pooling stages perform max pooling. Accesses on-die SRAM.

Figure 9:
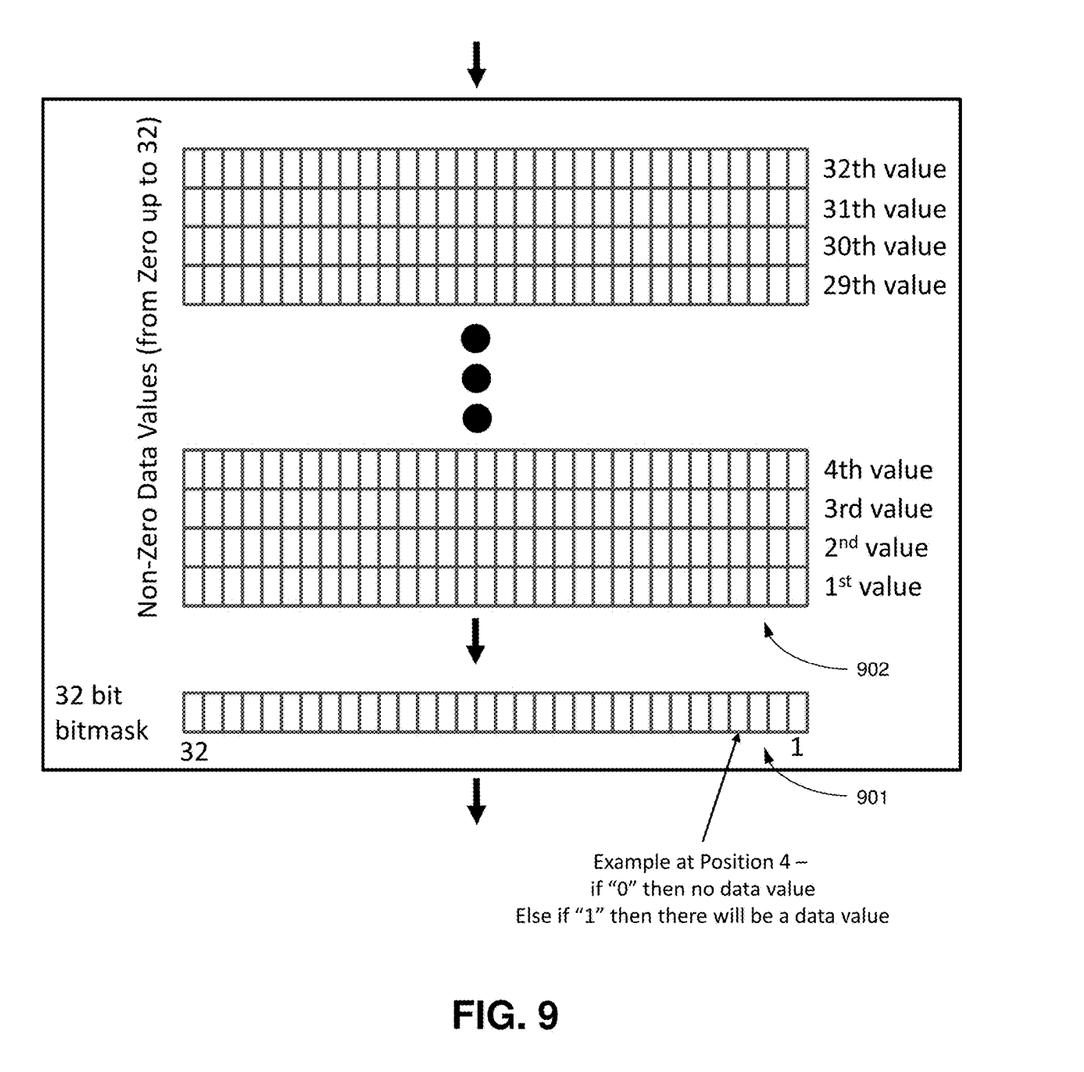
FIG. 9 is a schematic diagram of a compression data structure.
Figure 10:
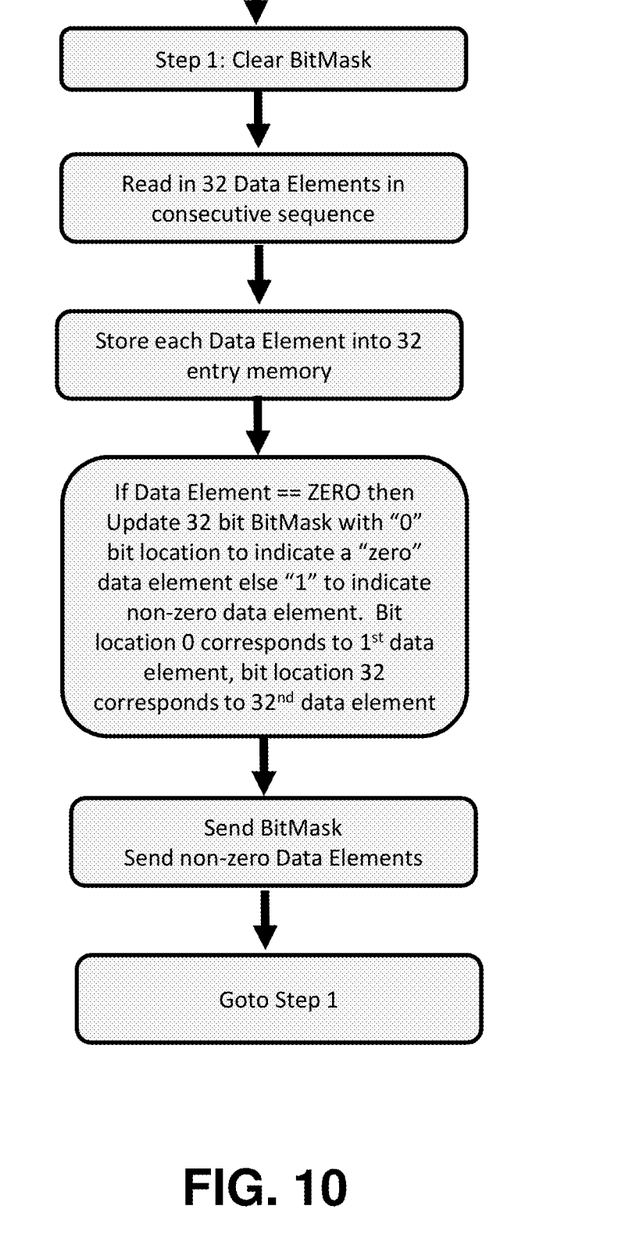
FIG. 10 is flowchart of an implementation of XEncoder.
Figure 11:
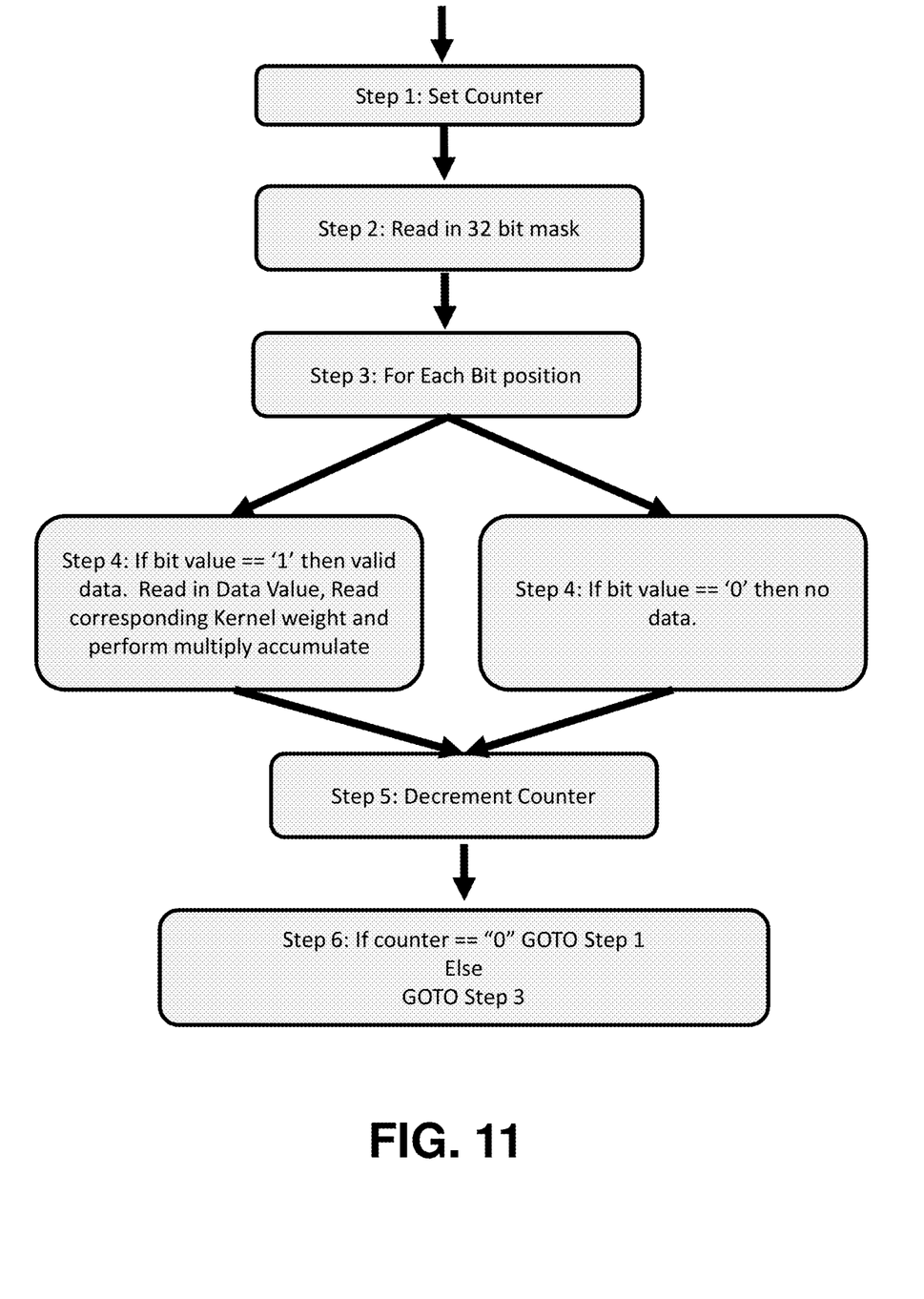
FIG. 11 is a flowchart of an implementation of ZMac.

The embodiments facilitate more efficient data compression. Neural Networks, by their very definition, contain a high degree of sparsity, for the SegNet CNN over 3× the computations involve a zero element. Clearly, having an architecture that can automatically eliminate the excess data movements for zero data, and the redundant multiply by zero for both random and non-random sparsity would result in higher performance and lower power dissipation. Data which is not moved results in a bandwidth reduction and a power savings. Multiplications that do not need to be performed also save power dissipation as well as allowing the multiplier to be utilized for data which is non-zero. The highest bandwidth and computation load in terms of multiply accumulates occurs in the DataStreams exiting the "Reorder" modules in 801 which feed the "Convolve" Modules 802. Automatically compressing the data leaving the reorder module, 801, reduces the bandwidth required to feed the convolve modules as well as reducing the maximum MAC (multiply accumulates) that each convolve performs. There are several possible zero compression schemes that may be performed, what is illustrated is a scheme which takes into account the nature of convolution neural networks. The input to a convolver, 802, consists of a 3-dimensional data structure (Width×Height×Channel). Convolution is defined as multiplying and summing (accumulating) each element of the W×H×C against a Kernel Weight data structure also consisting of (Width×Height×Channel). The data input into the convolver exhibits two types of sparsity—random zeros interspersed in the W×H×C data structure and short "bursts" of zeros across consecutive (W+1)×(H+1)×C data elements. The compressed data structure that is sent from the Reorder Modules to the Convolver modules is detailed in FIG. 9. For every possible 32 values one Bitmask value, 901, is sent followed by any non-zero data values, 902. Each bit position in the bitmask indicates where whether there is valid data or zero data in that position. In the case where there is no zero data, 901 will be all zeros, followed by 32 data values, 902. In the other extreme where there are 32 zero data values, 901 will be all "1"'s and no data values, 902, will follow. In the case there is a mixture of non-zero data values and data values the bitmask, 901, will indicate this and only the non-zero data values will follow in 902. FIG. 10 is the flow chart for the circuitry which resides in 801 the reorder module which performs the compression. FIG. 11 is the flow chart for the circuitry which resides in 802, the convolver, to perform the de-compression. Note that the bit position which is non-zero is critical since the convolution operation must multiply the non-zero data with the correct kernel weight—hence a counter (FIG. 11, step 1 and step 5) must be maintained. The advantage is as follows: Given a SegNet Reorder/Convolution of width 7, height 7 and channels 64 an approach with no compression will send 3136 (7×7×64) values from the reorder module, 801, to each convolver, 802 where 3136 Multiply Accumulations will be performed. With a 50% chance of zero values the described circuitry will send 98 BitMasks and only 1568 data values. This results in a savings in terms of bandwidth of almost 50% and a 50% reduction in multiply accumulates across 64 individual convolvers. Alternatively, a simpler compression scheme, such as the addition of an additional bit to each data values to indicate "non-zero" data plus the addition of several bits to indicate a "count" of zeros values can also be used to perform compression, at the penalty of increasing the bit width of the bus carrying the data values.

The embodiments disclosed herein can be used in connection with various computing platforms. The platforms may include electronic storage, one or more processors, and/or other components. Computing platforms may include communication lines, or ports to enable the exchange of information with a network and/or other computing platforms. The computing platforms may include a plurality of hardware, software, and/or firmware components operating together to provide the functionality attributed herein. Electronic storage may comprise non-transitory storage media that electronically stores information.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A reduced instruction set computer processor architecture comprising:
multiple RISC processors each defining a primary processing core in a control-centric mode, each primary processing core comprising:
a main memory;
at least one cache memory;
at least one arithmetic logic unit capable of reading from and writing to the at least one cache memory in a control-centric mode;
a plurality of different node wrappers, a respective one of the plurality of different node wrappers being respectively associated with each of the primary cores, each node wrapper of the plurality of different node wrappers being operable to define a plurality of secondary cores by reconfiguring hardware network connections in a manner that defines at least one pipeline in which data streams out of arithmetic logic units into the main memory and other ones of the plurality of arithmetic logic units in a streaming mode, each node wrapper of the plurality of different node wrappers comprising;
access memory associated with each arithmetic logic unit;
at least one load/unload matrix associated with each arithmetic logic unit; and
a partitioning logic module configured to individually configure each of the primary cores to operate in the streaming mode or the control-centric mode.

2. The processor architecture of claim 1, wherein the partitioning logic module is configured to partition the at least one load/unload matrix and meter data from the access memory and to combine load/unload matrix partitions back into a full output matrix.

3. The processor architecture of claim 1, wherein each secondary core comprises:
a processor including processing elements arranged in a ring, each processing element computes a rectangular partition of a result matrix, the result matrix being represented by the label Y, using single precision floating point arithmetic.

4. The processor architecture of claim 3 wherein each arithmetic logic unit has an input that is associated with a node input memory, partitioning logic and an input state machine for transferring data from memory to the arithmetic logic unit and wherein each arithmetic logic unit has an output that is associated with an output memory, the output memory being updated throughout processing with the latest sum for the arithmetic logic unit as it is computed.

5. The processor architecture of claim 1, wherein the architecture is formed on a single chip.

6. The processor architecture of claim 1 wherein, in the streaming mode, the arithmetic logic units of the RISC processor are used as streaming secondary cores.

7. The processor architecture of claim 1, wherein each cache memory is a nodal memory comprising multiple memories.

8. The processor architecture of claim 1, wherein each primary core has multiple arithmetic logic units.

9. The processor architecture of claim 8, wherein the arithmetic logic units are configured as at least one of integer multipliers, integer multiplier accumulators, integer dividers, floating point multipliers, floating point multiplier accumulators, floating point dividers.

10. The processor architecture of claim 9, wherein the arithmetic logic units are Single Instruction Multiple Data (SIMD) units.

11. The processor architecture of claim 9, wherein, in the streaming mode, each node wrapper defines multiple hardware streams to be allocated to specific ones of the secondary cores.

12. The processor architecture of claim 1, wherein, in the streaming mode, each node wrapper is fractured into multiple secondary core node wrappers.

13. The processor architecture of claim 1, wherein the partitioning logic module is configured to dynamically configure at least some of the primary cores to operate in the streaming mode or the control-centric mode in a dynamic manner during execution.

14. A method for reconfiguring a reduced instruction set computer processor architecture, the method comprising:
providing a plurality of primary processing cores defined by RISC processors, each primary processing core comprising a main memory, at least one cache memory, and a plurality of arithmetic logic units;
providing a plurality of different node wrappers, a respective one of the plurality of different node wrappers being respectively associated with each primary core, each node wrapper of the plurality of different node wrappers comprising access memory associated with each arithmetic logic unit, and a load/unload matrix associated with each arithmetic logic unit, each node wrapper being operable to define a plurality of secondary cores by reconfiguring hardware network connections in a manner that defines at least one pipeline in which data streams out of arithmetic logic units into the main memory and other ones of the plurality of arithmetic logic units in a streaming mode;
operating the architecture in a manner in which, for at least primary core, data is read from and written to the at least cache memory in a control-centric mode; and
selectively configuring at least one primary core to operate in a streaming mode wherein data streams out of corresponding arithmetic logic units into the main memory and other ones of the plurality arithmetic logic units.

15. The method of claim 14, wherein each secondary core comprises a processor including processing elements arranged in a ring, each processing element computes a rectangular partition of a result matrix, the result matrix being represented by the label Y, using single precision floating point arithmetic.

16. The method of claim 15 wherein each arithmetic logic unit has an input that is associated with a node input memory, partitioning logic and an input state machine for transferring data from memory to the arithmetic logic unit and wherein each arithmetic logic unit has an output that is associated with an output memory, the output memory being updated throughout processing with the latest sum for the arithmetic logic unit as it is computed.

17. The method architecture of claim 14 wherein, in the streaming mode, the arithmetic logic units of the RISC processor are used as streaming secondary cores.

18. The method of claim 14, wherein each cache memory is a nodal memory comprising multiple memories.

19. The method of claim 14, wherein each primary core has multiple arithmetic logic units.

20. The method of claim 19, wherein the arithmetic logic units are configured as at least one of integer multipliers, integer multiplier accumulators, integer dividers, floating point multipliers, floating point multiplier accumulators, floating point dividers.

21. The method of claim 19, wherein the arithmetic logic units are Single Instruction Multiple Data (SIMD) units.

22. The method of claim 19, wherein, in the streaming mode, each node wrapper defines multiple hardware streams to be allocated to specific ones of the secondary cores.

23. The method of claim 14, wherein, in the streaming mode, each node wrapper is fractured into multiple secondary core node wrappers.

24. The method of claim 14, wherein the step of selectively configuring at least one primary core to operate in a streaming mode wherein data streams out of corresponding arithmetic logic units into the main memory and other ones of the plurality arithmetic logic units comprises dynamically configuring at least some of the primary cores to operate in the streaming mode or the control-centric mode in a dynamic manner during execution.

\* \* \* \* \*